Patented Oct. 20, 1925.

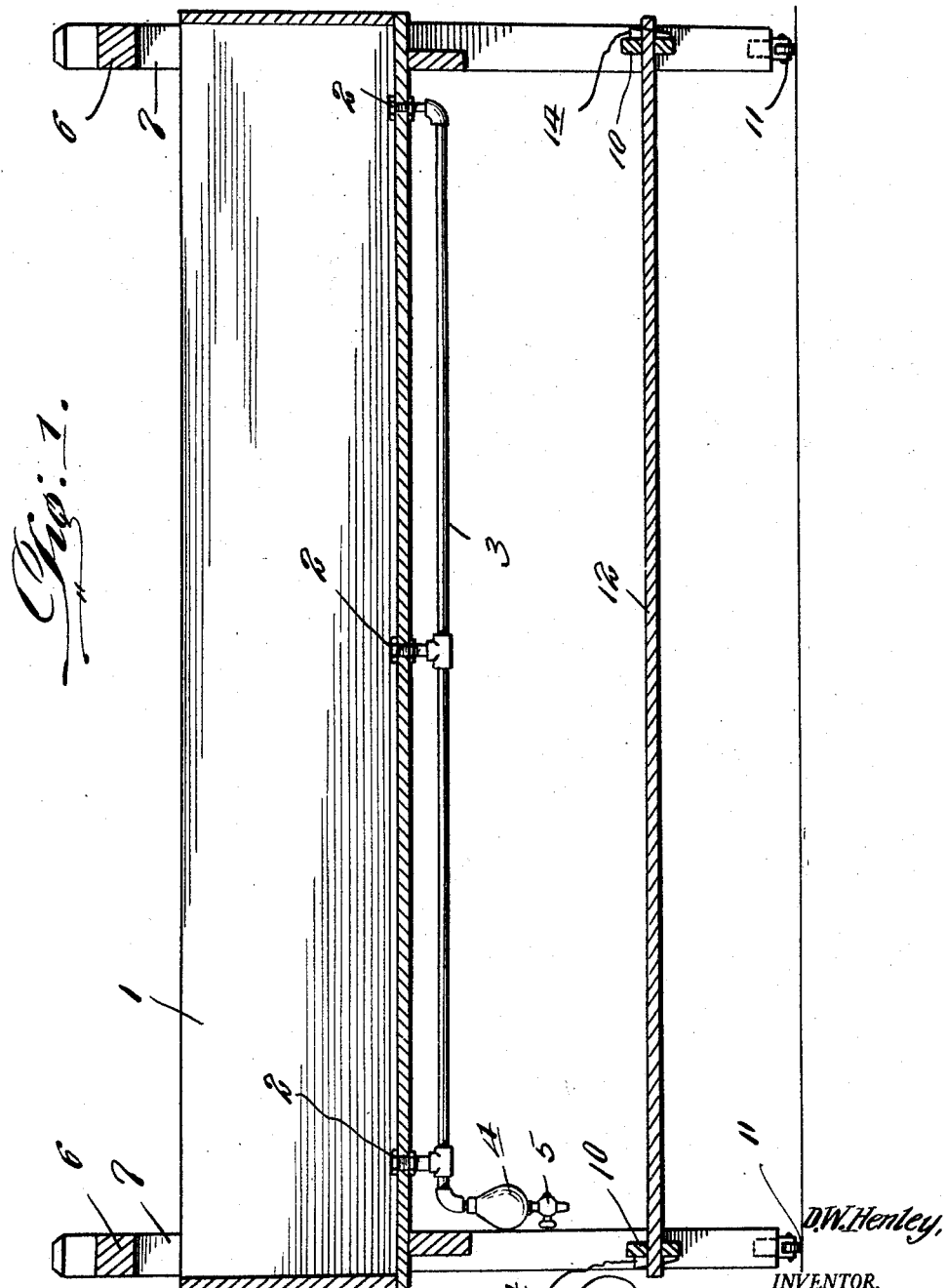

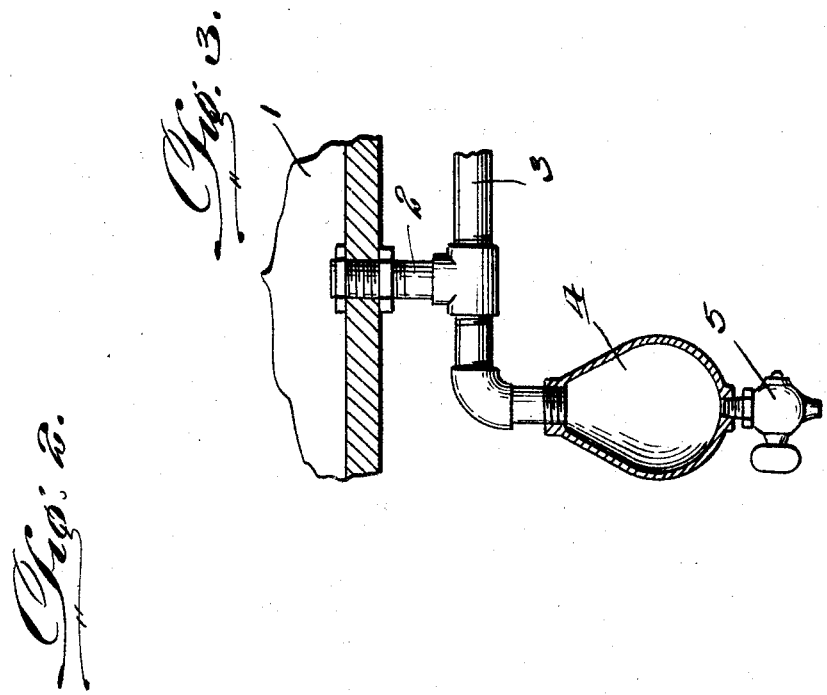
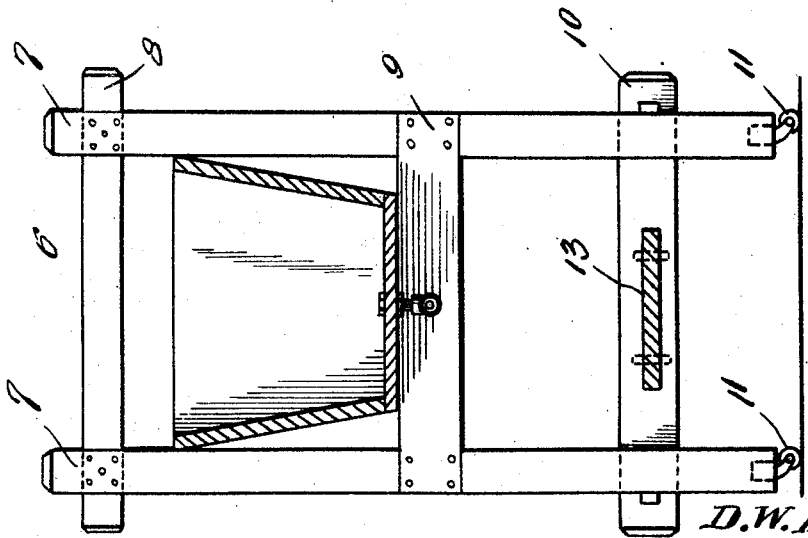

1,558,357

UNITED STATES PATENT OFFICE.

DE WITT HENLEY, OF HOUSTON, TEXAS.

FLOWER BOX.

Application filed December 26, 1922. Serial No. 608,843.

*To all whom it may concern:*

Be it known that I, DE WITT HENLEY, a citizen of the United States, residing at Houston, in the county of Harris and State of Texas, have invented certain new and useful Improvements in Flower Boxes, of which the following is a specification.

The primary object of my said invention is the provision of a flower box, wherein the same is of comparatively simple construction, inexpensive of manufacture and such a box that may be readily moved from place to place, so as to be positioned at convenient points on the porches of homes or in the yards thereof, as found desirable.

A further object of the invention resides in the provision of such a flower box that is capable of being disassembled for permitting the same to be readily stored in a small compass in the winter time.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a longitudinal cross sectional view of a device constructed in accordance with the present invention.

Figure 2—is a vertical transverse sectional view of the same, and

Figure 3—is an enlarged fragmentary cross sectional view of a portion of the flower box per se, showing more clearly the water outlet means.

With particular reference to the drawings, my device includes the provision of a relatively elongated flower box 1 of wood, metal, reinforced concrete or other appropriate material. The bottom wall of this receptacle is provided with spaced openings for receiving water outlet pipes 2, which outlet pipes have communication with another pipe 3 extending longitudinally beneath the flower box, and having communication at one end with a drip chamber 4.

This chamber 4 carries a pet cock 5, through the instrumentality of which, the water may be removed from the chamber 4.

As will be at once apparent, the box 1 is adapted for the reception of the dirt and flowers and whenever an excessive amount of water is received within this box, the same may be adequately drained therefrom, by the provision of the pet cock 5.

The box 1 is adapted for support between a pair of standards 6, each of these standards including spaced legs 7, rigidly joined together by cross bars 8, 9 and 10. The bottom ends of the legs constituting each of the standards 6 carry detachable rollers 11 for permitting of the device to be readily moved from place to place.

The standards 6 are maintained in spaced set up position through the instrumentality of a longitudinal connecting arm 12. The ends of this arm 12 engage through openings 13 centrally within the connecting bars 10 of each pair of legs 7. The arm 12 is secured in position between the standards by switch blocks, engaging through suitable openings in the projecting ends of the said arm.

The box 1 is adapted for support upon the central connecting members 9 of each pair of legs constituting the standards as clearly shown in Figures 1 and 2, and while I have herein shown and described the preferred embodiment of the present invention, it is nevertheless to be understood that minor changes may be made therein, without departing from the spirit and scope of the invention as claimed.

What I claim as new is:—

In a flower box structure, a stand, a box supported thereon in a horizontal position and elevated above the bottom of the stand, pipes passing vertically through the bottom of the box, a horizontally disposed pipe located below the box and connected with the first mentioned pipes, a drip chamber connected with the horizontal pipe and located below the same, and a valve cock connected with the drip chamber and supported above the bottom of the stand.

In testimony whereof I affix my signature.

DE WITT HENLEY.